US012292925B2

(12) United States Patent
Cheng

(10) Patent No.: US 12,292,925 B2
(45) Date of Patent: May 6, 2025

(54) DISPLAY CONTROL DEVICE, SURVEILLANCE SUPPORT SYSTEM, DISPLAY CONTROL METHOD, AND NON-TRANSITORY COMPUTER-READABLE MEDIUM

(71) Applicant: NEC Corporation, Tokyo (JP)

(72) Inventor: Jian Cheng, Tokyo (JP)

(73) Assignee: NEC CORPORATION, Tokyo (JP)

(*) Notice: Subject to any disclaimer, the term of this patent is extended or adjusted under 35 U.S.C. 154(b) by 167 days.

(21) Appl. No.: 17/917,287

(22) PCT Filed: Apr. 15, 2021

(86) PCT No.: PCT/JP2021/015644
§ 371 (c)(1),
(2) Date: Oct. 6, 2022

(87) PCT Pub. No.: WO2021/210657
PCT Pub. Date: Oct. 21, 2021

(65) Prior Publication Data
US 2023/0185850 A1 Jun. 15, 2023

(30) Foreign Application Priority Data
Apr. 16, 2020 (JP) ................. 2020-073276

(51) Int. Cl.
G06F 16/74 (2019.01)
G06V 20/52 (2022.01)
H04N 23/90 (2023.01)

(52) U.S. Cl.
CPC ............ G06F 16/745 (2019.01); G06V 20/52 (2022.01); H04N 23/90 (2023.01)

(58) Field of Classification Search
CPC ....... G06F 16/745; G06V 20/52; H04N 23/90
See application file for complete search history.

(56) References Cited

U.S. PATENT DOCUMENTS

2006/0062430 A1* 3/2006 Vallone .................. H04N 7/181
348/E7.086
2008/0304706 A1* 12/2008 Akisada ................. H04N 7/185
382/103
(Continued)

FOREIGN PATENT DOCUMENTS

JP H07-168991 A 7/1995
JP H10-290447 A 10/1998
(Continued)

OTHER PUBLICATIONS

International Search Report for PCT Application No. PCT/JP2021/015644, mailed on Jul. 13, 2021.

Primary Examiner — Mishawn N. Hunter
(74) Attorney, Agent, or Firm — Sughrue Mion, PLLC

(57) ABSTRACT

A display control device (10) includes an acquisition unit (11), a control unit (13), and an output unit (18). The acquisition unit (11) acquires video data captured by each of a plurality of image capturing devices from each of the plurality of image capturing devices. In response to detection of a target state of a monitoring target from each of two or more pieces of video data among a plurality of pieces of the video data, the control unit (13) allocates a time order of output to a display device to each of the target video data being the video data in which the target state is detected. The output unit (18) sequentially outputs the target video data to the display device, based on the allocated time order.

8 Claims, 13 Drawing Sheets

(56) References Cited

U.S. PATENT DOCUMENTS

| | | | | |
|---|---|---|---|---|
| 2017/0206424 A1* | 7/2017 | Uchida | ............... | G08B 13/196 |
| 2019/0306433 A1* | 10/2019 | Taki | .................... | G06V 10/235 |

FOREIGN PATENT DOCUMENTS

| | | | |
|---|---|---|---|
| JP | 2001-045474 | A | 2/2001 |
| JP | 2007-199840 | A | 8/2007 |
| JP | 2010-206475 | A | 9/2010 |
| JP | 2012-025327 | A | 2/2012 |
| JP | 2013-097094 | A | 5/2013 |
| JP | 2020-047069 | A | 3/2020 |

\* cited by examiner

DISPLAY CONTROL DEVICE, SURVEILLANCE SUPPORT SYSTEM, DISPLAY CONTROL METHOD, AND NON-TRANSITORY COMPUTER-READABLE MEDIUM

This application is a National Stage Entry of PCT/JP2021/015644 filed on Apr. 15, 2021, which claims priority from Japanese Patent Application 2020-073276 filed on Apr. 16, 2020, the contents of all of which are incorporated herein by reference, in their entirety.

TECHNICAL FIELD

The present disclosure relates to a display control device, a surveillance support system, a display control method, and a non-transitory computer-readable medium.

BACKGROUND ART

In recent years, as a security measure in an information society, monitoring by monitoring cameras has been performed in buildings, facilities, and the like. Monitoring cameras are installed in various places, from a large facility being used by many and unspecified people to a public facility, an office, a deserted warehouse, and a private residence. Monitoring by such monitoring cameras is performed by displaying video images captured by the monitoring cameras on a monitor.

For example, Patent Literature 1 discloses a monitoring device that automatically switches video images of a plurality of monitoring cameras, which are displayed on a monitor, and displays video images of the monitoring cameras associated to an alarm signal by interruption on a monitor in response to generation of the alarm signal.

Patent Literature 2 discloses a surveillance support device that superimposes and displays a difference area of a plurality of video images that have changed, among video images captured by a plurality of cameras.

CITATION LIST

Patent Literature

[Patent Literature 1] Japanese Unexamined Patent Application Publication No. H07-168991
[Patent Literature 2] Japanese Unexamined Patent Application Publication No. 2010-206475

SUMMARY OF INVENTION

Technical Problem

However, in the monitoring device described in Patent Literature 1, there is a problem that, when an alarm signal is generated for a plurality of monitoring cameras, video images of the plurality of monitoring cameras at the time of generation of the alarm signal cannot be displayed on the monitor.

Further, in the surveillance support device described in Patent Literature 2, there is a problem that, when there are a large number of video images that have changed at a time, a monitoring load of a monitoring person increases, and there is a possibility that overlooking of a monitoring target may occur.

In view of the above-described problems, an object of the present disclosure is to provide a display control device, a surveillance support system, a display control method, and a non-transitory computer-readable medium that are able to reduce a monitoring load of a monitoring person and prevent overlooking of a monitoring target.

Solution to Problem

A display control device according to one aspect of the present disclosure includes an acquisition means, a control means, and an output means. The acquisition means acquires video data captured by each of a plurality of image capturing devices from each of the plurality of image capturing devices. The control means allocates a time order of output to a display device to each piece of target video data being the video data in which a target state of a monitoring target is detected, in response to detection of the target state from each of two or more pieces of the video data among a plurality of pieces of the video data. The output means sequentially outputs the target video data to the display device, based on the allocated time order.

A surveillance support system according to one aspect of the present disclosure includes a plurality of image capturing devices, a display control device, and a display device. The plurality of image capturing devices capture images of a monitoring target and generate video data. The display control device includes an acquisition means, a control means, and an output means. The acquisition means acquires video data captured by each of a plurality of image capturing devices from each of the plurality of image capturing devices. The control means allocates a time order of output to the display device to each piece of target video data being the video data in which a target state of a monitoring target is detected, in response to detection of the target state from each of two or more pieces of the video data among a plurality of pieces of the video data. The output means sequentially outputs the target video data to the display device, based on the allocated time order. The display device displays the target video data.

A display control method according to one aspect of the present disclosure includes: acquiring video data captured by each of a plurality of image capturing devices from each of the plurality of image capturing devices; allocating a time order of output to a display device to each piece of target video data being the video data in which a target state of a monitoring target is detected, in response to detection of the target state from each of two or more pieces of the video data among a plurality of pieces of the video data; and sequentially outputting the target video data to the display device, based on the allocated time order.

A non-transitory computer-readable medium according to one aspect of the present disclosure stores a display control program causing a computer to execute a display control method. The display control method includes: acquiring video data captured by each of a plurality of image capturing devices from each of the plurality of image capturing devices; allocating a time order of output to a display device to each piece of target video data being the video data in which a target state of a monitoring target is detected, in response to detection of the target state from each of two or more pieces of the video data among a plurality of pieces of the video data; and sequentially outputting the target video data to the display device, based on the allocated time order.

Advantageous Effects of Invention

According to the present disclosure, it is possible to provide a display control device, a surveillance support system, a display control method, and a non-transitory computer-readable medium that are able to reduce a monitoring load of a monitoring person and prevent overlooking of a monitoring target.

EXAMPLE EMBODIMENT

Figure 1:
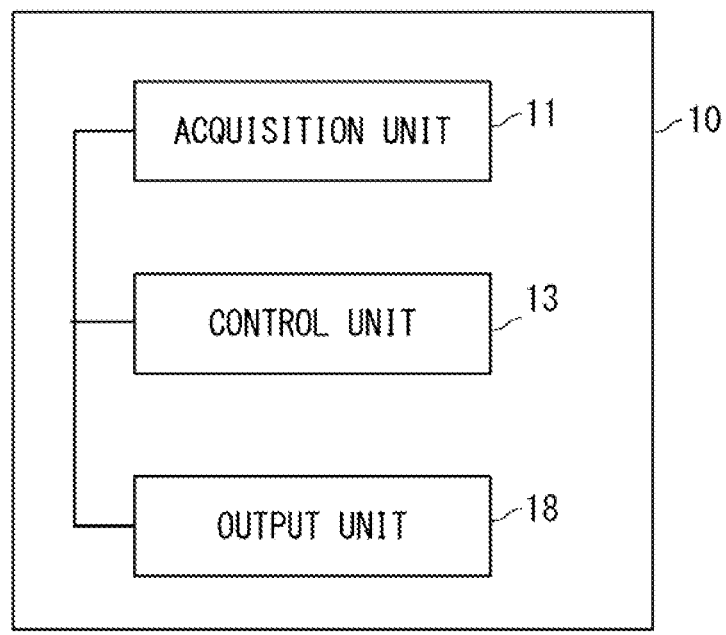
FIG. 1 is a block diagram illustrating a configuration of a display control device according to a first example embodiment.

Hereinafter, the present disclosure will be described through example embodiments, but the disclosure according to claims is not limited to the following example embodiments. In addition, not all of the configurations described in the example embodiments are indispensable as a means for solving the problems. In the drawings, the same elements are denoted by the same reference numerals, and a repetitive description thereof is omitted as necessary.

First Example Embodiment

First, a first example embodiment of the present disclosure will be described by using FIGS. 1 to 2. FIG. 1 is a block diagram illustrating a configuration of a display control device 10 according to the first example embodiment. A display control device 10 includes an acquisition unit 11, a control unit 13, and an output unit 18.

The acquisition unit 11 is also called an acquisition means. The acquisition unit 11 acquires video data captured by each of a plurality of image capturing devices from each of the plurality of image capturing devices.

The control unit 13 is also called a control means. In response to detection of a target state of a monitoring target from each of two or more pieces of video data among the plurality of pieces of video data, the control unit 13 allocates a time order of output to the display device to each of target video data. Herein, the target video data are video data in which the target state is detected.

The output unit 18 is also called an output means. The output unit 18 sequentially outputs the target video data to the display device, based on the allocated time order.

Figure 2:
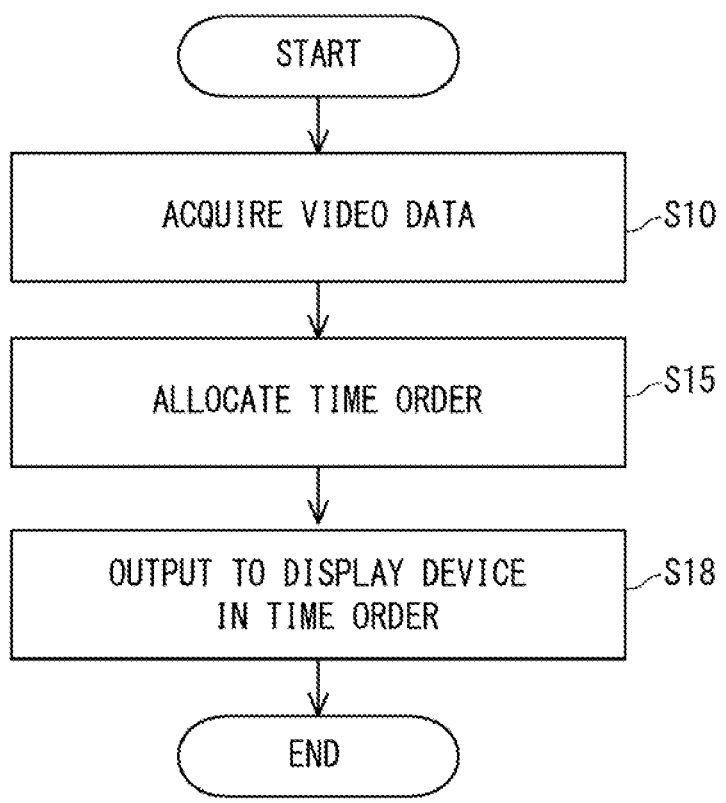
FIG. 2 is a flowchart illustrating processing of the display control device according to the first example embodiment.

FIG. 2 is a flowchart illustrating processing of the display control device 10 according to the first example embodiment.

First, in step S10, the acquisition unit 11 acquires video data from each of the plurality of image capturing devices.

Next, in step S15, in response to detection of a target state from two or more pieces of video data among the acquired video data, the control unit 13 allocates a time order of output to the display device to each piece of target video data.

Next, in step S18, the output unit 18 sequentially outputs the target video data to the display device, based on the allocated time order.

As described above, according to the first example embodiment, the display control device 10 allocates a time order of outputting the target video data, and sequentially outputs the target video data to the display device, based on the time order. Therefore, the display control device 10 can reduce a monitoring load of a monitoring person who monitors a monitored target, and prevent overlooking of the monitored target.

Second Example Embodiment

Figure 3:
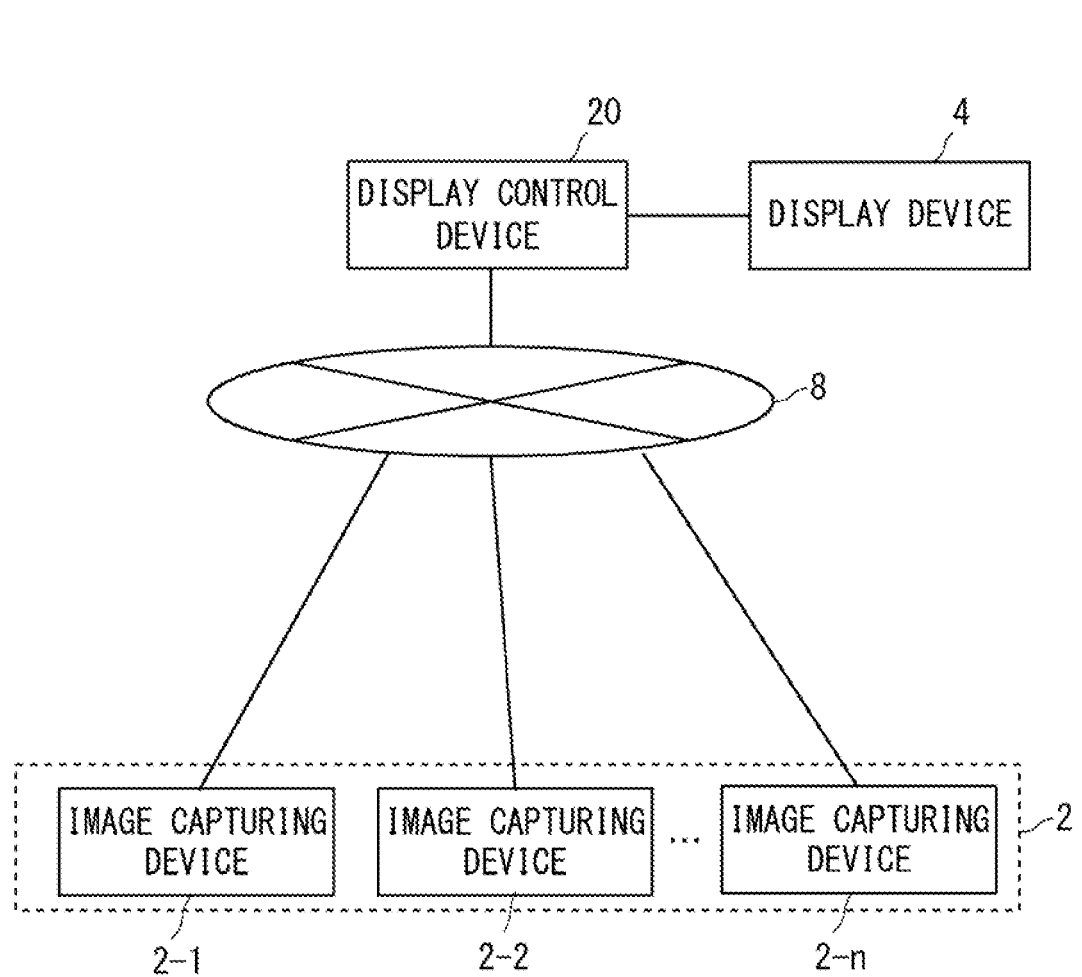
FIG. 3 is a block diagram illustrating an example of a configuration of a surveillance support system according to a second example embodiment.

Next, a second example embodiment of the present disclosure will be described by using FIGS. 3 to 8. FIG. 3 is a block diagram illustrating an example of a configuration of a surveillance support system 1 to which the display control device according to the second example embodiment can be applied. The surveillance support system 1 is a system that remotely monitors a monitoring target by using video data from an image capturing device installed at each place of a monitoring target area.

Herein, the monitoring target area indicates an area to be monitored. The monitoring target is a person, an object, a vehicle, an animal, or the like that is a monitoring target. In the second example embodiment, the monitoring target is a person.

The monitoring target area may be, by way of example, a school, a night-time commercial facility, a managed place or warehouse which is a maintenance base of a security company, or the like. At this time, the monitoring target may be a suspicious person or the like. The monitoring target area may be a hospital, a nursing facility, or the like. The monitoring target may be a patient of a hospital or a resident of a nursing facility.

Herein, the surveillance support system 1 includes a plurality of image capturing devices 2-1, 2-2, . . . , 2-n, a display device 4, and a display control device 20. Hereinafter, when the image capturing devices 2-1, 2-2, . . . , 2-n are not distinguished from each other, the image capturing devices 2-1, 2-2, . . . , 2-n may be simply referred to as an image capturing device 2.

The image capturing device 2 is a monitoring camera installed at each place of a monitoring target area. The image capturing apparatus 2 captures an image of a monitoring target at the installation place, and generates video data. The image capturing device 2 is communicably connected to a network 8, and transmits the generated video data to the display control device 20 in real time via the network 8.

The display control device 20 is a computer or the like that is communicably connected to the network 8. The display control device 20 outputs, to the display device 4, target video data, which are video data in which a target state of the monitoring target is detected, out of the video data received from the image capturing device 2 via the network 8. Herein, the target state is a state indicating an abnormality of the monitoring target, and in the second example embodiment, as an example, a state in which a person is moving may be used. Namely, in the second example embodiment, the display control device 20 outputs, to the display device 4, target video data, which are video data in which a moving body is detected, out of the video data received from the image capturing device 2.

The display device 4 is a monitor that displays the target video data being output from the display control device 20. In the second example embodiment, the display device 4 is a single monitor. Although the display device 4 is connected to the network 8 via the display control device 20 in this figure, the display device 4 may be directly connected to the network 8.

The network 8 includes various networks such as the Internet, a wide area network (WAN), and a local area network (LAN), or a combination thereof. The network 8 may include a dedicated line separated from the Internet.

Figure 4:
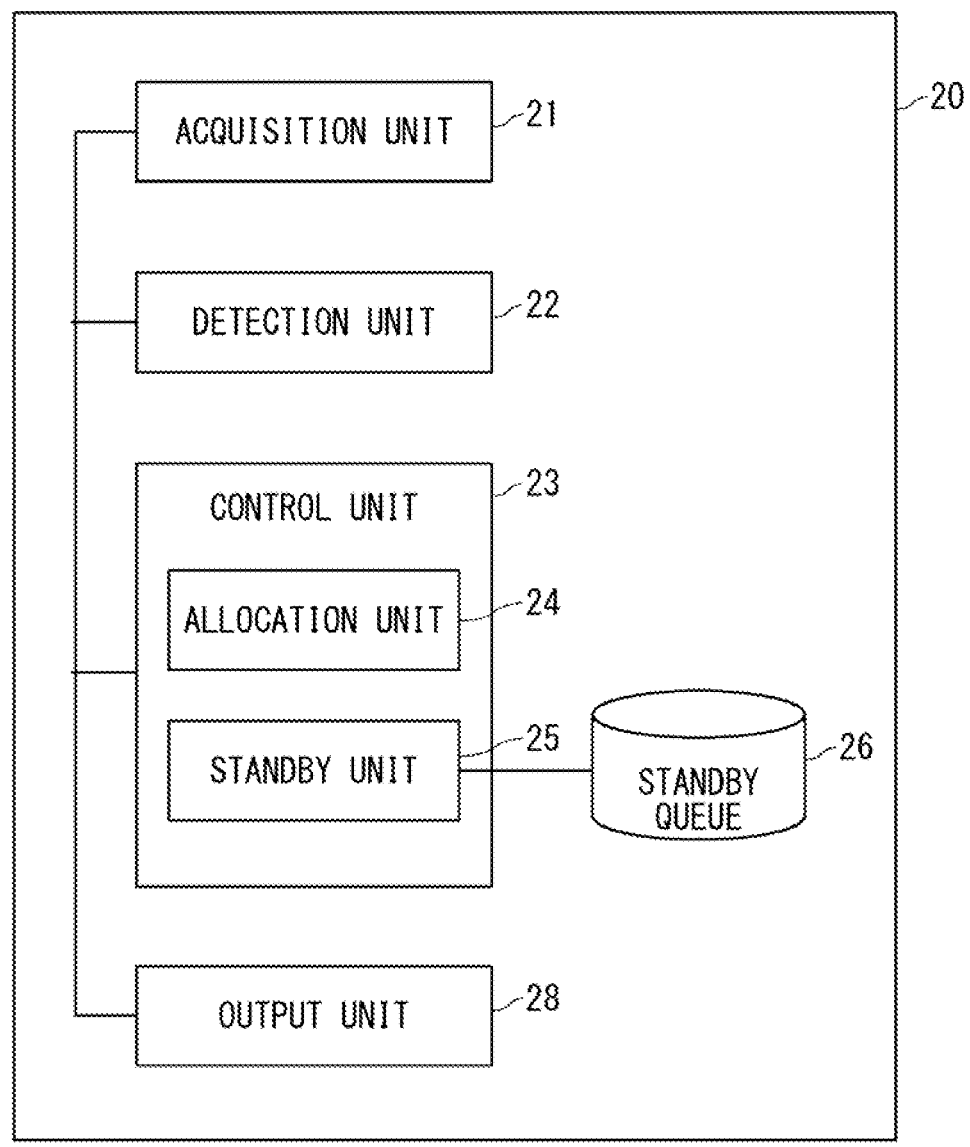
FIG. 4 is a block diagram illustrating an example of a configuration of a display control device according to the second example embodiment.

Next, a configuration of the display control device 20 will be described by using FIG. 4. FIG. 4 is a block diagram illustrating an example of the configuration of the display control device 20 according to the second example embodiment.

The display control device 20 includes an acquisition unit 21, a detection unit 22, a control unit 23, a standby queue 26, and an output unit 28.

The acquisition unit 21 is an example of the acquisition unit 11 described above. The acquisition unit 21 acquires video data captured by each of the image capturing devices 2 from each of the image capturing devices 2. The video data include a plurality of frames each having a different photographing time. The acquisition unit 21 supplies the acquired video data to the detection unit 22.

The detection unit 22 is also called a detection means. The detection unit 22 detects a target state of a monitoring target with respect to the video data of each of the image capturing devices 2. In the second example embodiment, the target state to be monitored is a state in which a person is moving, i.e., a moving body. For example, the detection unit 22 may detect an image of a moving body in video data, based on a difference between frames included in the video data.

It should be noted that the detection unit 22 defines a photographing time of the target video data in which the target state is detected, and supplies the target video data together with the photographing time to the control unit 23.

The control unit 23 is an example of the control unit 13 described above. The control unit 23 executes control for outputting the target video data supplied from the detection unit 22 to the display device 4. The control unit 23 includes an allocation unit 24 and a standby unit 25.

The allocation unit 24 is also called an allocation means. The allocation unit 24 allocates a time order of output to the display device 4 to each piece of the target video data in response to detection of the target state of the monitoring target from the video data relating to two or more pieces of image capturing devices among the plurality of pieces of video data. Namely, when two or more pieces of target video data are included in the acquired video data, the allocation unit 24 allocates the time order of output to each piece of target video data. The allocation unit 24 may allocate the time order in such a way that the plurality of pieces of target video data are output to the display device 4 in a time-division manner. Herein, one unit of a time interval in which one target video data is output to the display device 4 is referred to as a time slot. In this case, the control unit 23 allocates a time slot number for output to each piece of the target video data photographed during the same time slot. In the second example embodiment, a length of each time slot may be determined in advance. The length of the time slot may be a maximum of 6 seconds.

The standby unit 25 is also called a standby means. The standby unit 25 stores the target video data supplied from the detection unit 22 in the standby queue 26. At this time, the standby unit 25 may rearrange the target video data, based on the allocated time order and store the rearranged video data in the standby queue 26. Then, the standby unit 25 extracts the target video data from the standby queue 26, based on the allocated time order, and sequentially supplies the target video data to the output unit 28. As a result, the standby unit 25 sequentially outputs the target video data from the standby queue 26 to the display device 4 via the output unit 28.

The standby queue 26 is a storage medium for temporarily storing target video data to be output to the display device 4, i.e., scheduled to be supplied to the output unit 28.

The output unit 28 is an example of the output unit 18 described above. The output unit 28 outputs the target video data to the display device 4 in response to the supply of the target video data from the standby unit 25. As a result, the output unit 28 sequentially outputs the target video data to the display device 4, based on the allocated time order. In the second example embodiment, the output unit 28 does not output video data in which the target state is not detected among the video data relating to the plurality of image capturing devices 2 to the display device 4.

Figure 5:
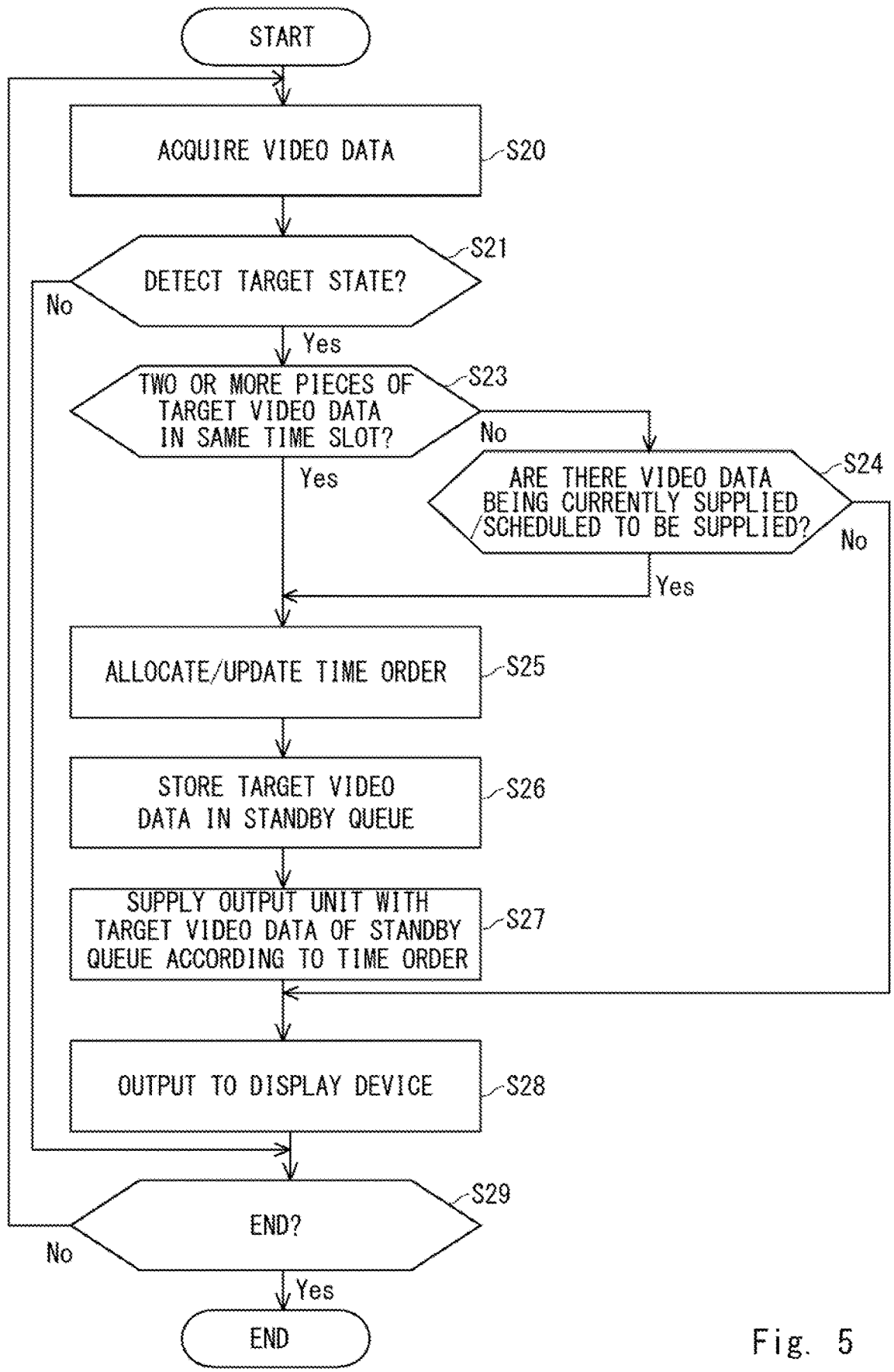
FIG. 5 is a flowchart illustrating an example of processing of the display control device according to the second example embodiment.

Next, processing of the display control device 20 according to the second example embodiment will be described by using FIG. 5. FIG. 5 is a flowchart illustrating an example of the processing of the display control device 20 according to the second example embodiment. In the present example, it is assumed that the processing of the display control device 20 in an initial condition is illustrated, and there is no video data being output from the display control device 20 to the display device 4 at an initial time $t_0$.

First, in step S20, the acquisition unit 21 of the display control device 20 acquires video data from each of the plurality of image capturing devices 2. In the present example, for convenience of description, the acquisition unit 21 acquires video data from each of the plurality of image capturing devices 2 for each time slot TS. Therefore, when the time slot TS is short, the acquisition unit 21 acquires video data from each of the image capturing devices 2 in substantially real time. The video data in one time slot TS have a plurality of frames photographed at different photographing times within the same time slot TS. The acquisition unit 21 supplies the acquired video data to the detection unit 22.

Next, in step S21, the detection unit 22 performs processing of detecting the target state of the monitoring target for each piece of the video data relating to the plurality of image capturing devices 2 photographed in the same time slot TS, and determines whether or not there are video data in which the target state is detected. Herein, in the second example embodiment, the detection unit 22 may detect a person area from each frame of video data by using a person detector learned by machine learning, extract a difference between the frames, and detect a movement of a person which is captured in the video data. In addition, the detection unit 22 may detect a posture or the like of the person by using a skeleton detector learned by the machine learning, extract a difference between the frames, and detect an operation of the person to be monitored which is reflected in the video image. The person detector or the skeleton detector may include a convolution neural network. For example, when the monitoring target area is a hospital, the person detector or skeleton detector may be learned to distinguish between a patient and a hospital personnel and detect only the patient.

When it is determined that the video data in which the target state is detected (target video data) is included in the video data acquired in step S20 (Yes in step S21), the detection unit 22 advances the processing to step S23. On the other hand, otherwise (No in step S21), the detection unit 22 advances the processing to step S29.

In step S23, the detection unit 22 determines whether or not the video data acquired in step S20, i.e., the video data photographed in the same time slot TS includes two or more pieces of target video data. When the detection unit 22 determines that two or more pieces of target video data are included (Yes in step S23), the detection unit 22 defines a photographing time for each piece of target video data, and supplies the target video data together with the photographing time to the control unit 23. Herein, the detection unit 22 may define the photographing time by using metadata accompanying the video data, or may define a time at which the target state has been detected as the photographing time. Note that the detection unit 22 may define video data photographed in the same time slot TS as the same photographing time. The detection unit 22 then advances the processing to step S25.

On the other hand, when it is not determined that two or more pieces of target video data are included (No in step S23), i.e., when there is one piece of target video data in the same time slot TS, the detection unit 22 supplies the target video data to the control unit 23, and advances the processing to step S24.

In step S24, the control unit 23 determines whether there are video data currently being supplied or scheduled to be supplied from the standby unit 25 to the output unit 28. When it is determined that there are video data currently being supplied or scheduled to be supplied (Yes in step S24), the control unit 23 advances the processing to step S25; otherwise (No in step S24), the control unit 23 supplies the target video data to the output unit 28, and advances the processing to step S28. Since there is no video data or the like currently being supplied at the initial time to, the processing is advanced to S28 at the initial time to.

In step S25, the allocation unit 24 of the control unit 23 allocates a time order to each piece of the target video data. In the second example embodiment, the allocation unit 24 allocates a time slot number for outputting to each piece of the target video data.

At this time, the allocation unit 24 may allocate the time order in such a way that the video data of the image capturing device 2 having a small number that is previously assigned to each of the image capturing devices 2 are output first to the display apparatus 4 from the target video data of the image capturing device 2.

Note that the allocation unit 24 may allocate the time order, based on the photographing time of the target video data, for example, when there are the target video data currently being supplied or scheduled to be supplied at the current time. Namely, the allocation unit 24 may allocate the time order in such a way that the target video data having an earlier defined photographing time are output to the display device 4. As a result, the display control device 20 can display the target video data in time series.

In this case, the allocation unit 24 may reallocate the time order to all the target video data including new target video data, and may update the time order.

The allocation unit 24 supplies the latest information of the allocated time order to the standby unit 25 of the control unit 23, and advances the processing to step S26.

In step S26, the standby unit 25 rearranges the target video data, based on the allocated time order, and stores the rearranged target video data in the standby queue 26.

Next, in step S27, the standby unit 25 extracts the target video data having the lowest time order from the standby queue 26 in accordance with the allocated time order, and supplies the target video data to the output unit 28. At this time, the standby unit 25 may delete the extracted target video data from the standby queue 26.

Next, in step S28, the output unit 28 outputs the target video data supplied from the standby unit 25 to the display device 4.

Then, in step S29, the display control device 20 determines whether or not to terminate a series of processing. The case of terminating the series of processing is, for example, a case where the surveillance support system 1 is stopped, a case where the processing is terminated by an operation of a monitoring person, or the like. When the display control device 20 does not determine to terminate the series of processing (No in step S29), the display control device 20 returns the processing to step S20. When it is determined that the series of processing is terminated (Yes in step S29), the display control device 20 terminates the processing.

Figure 6:
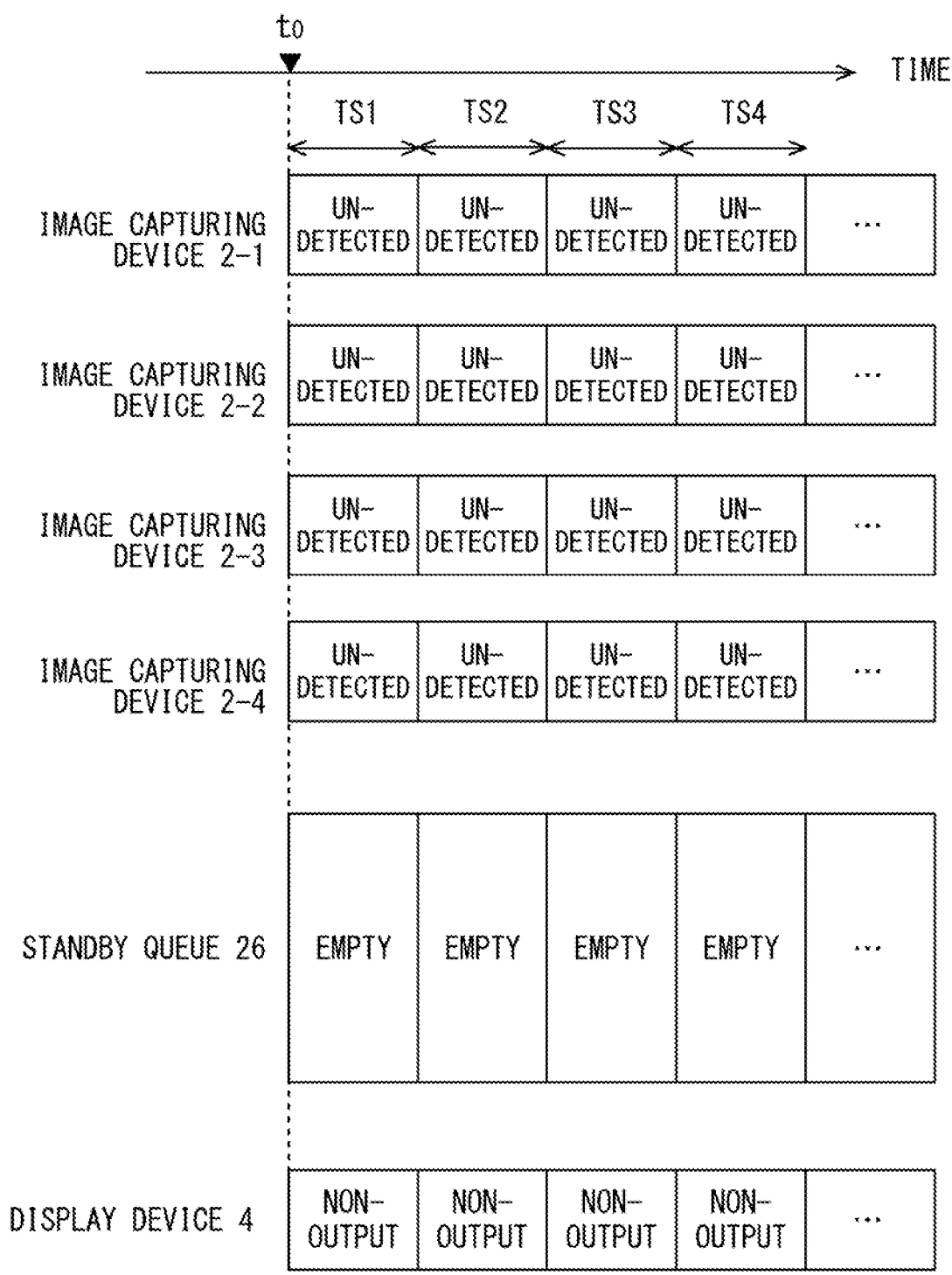
FIG. 6 is a diagram for explaining an example of processing of the display control device according to the second example embodiment.
Figure 7:
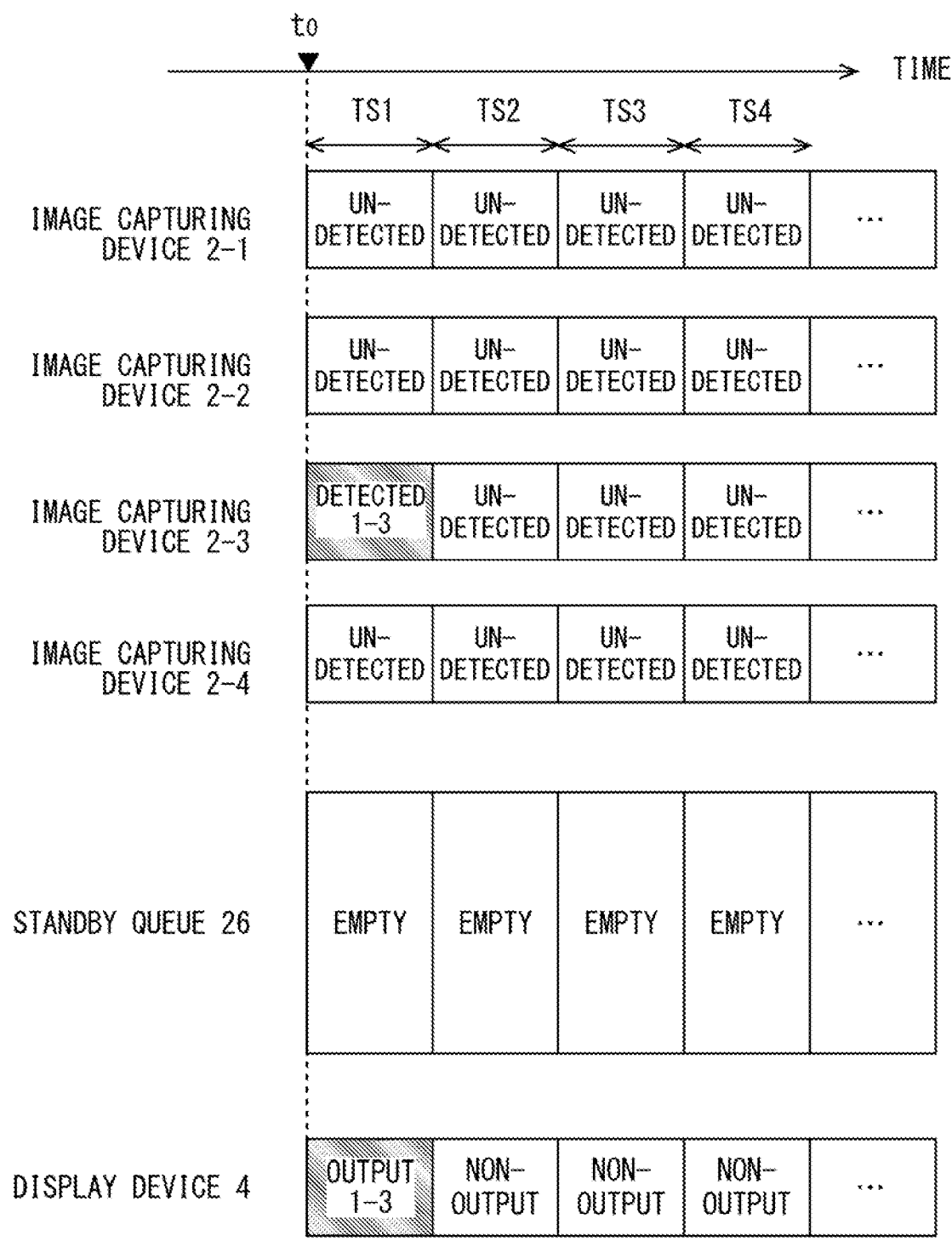
FIG. 7 is a diagram for explaining an example of processing of the display control device according to the second example embodiment.
Figure 8:
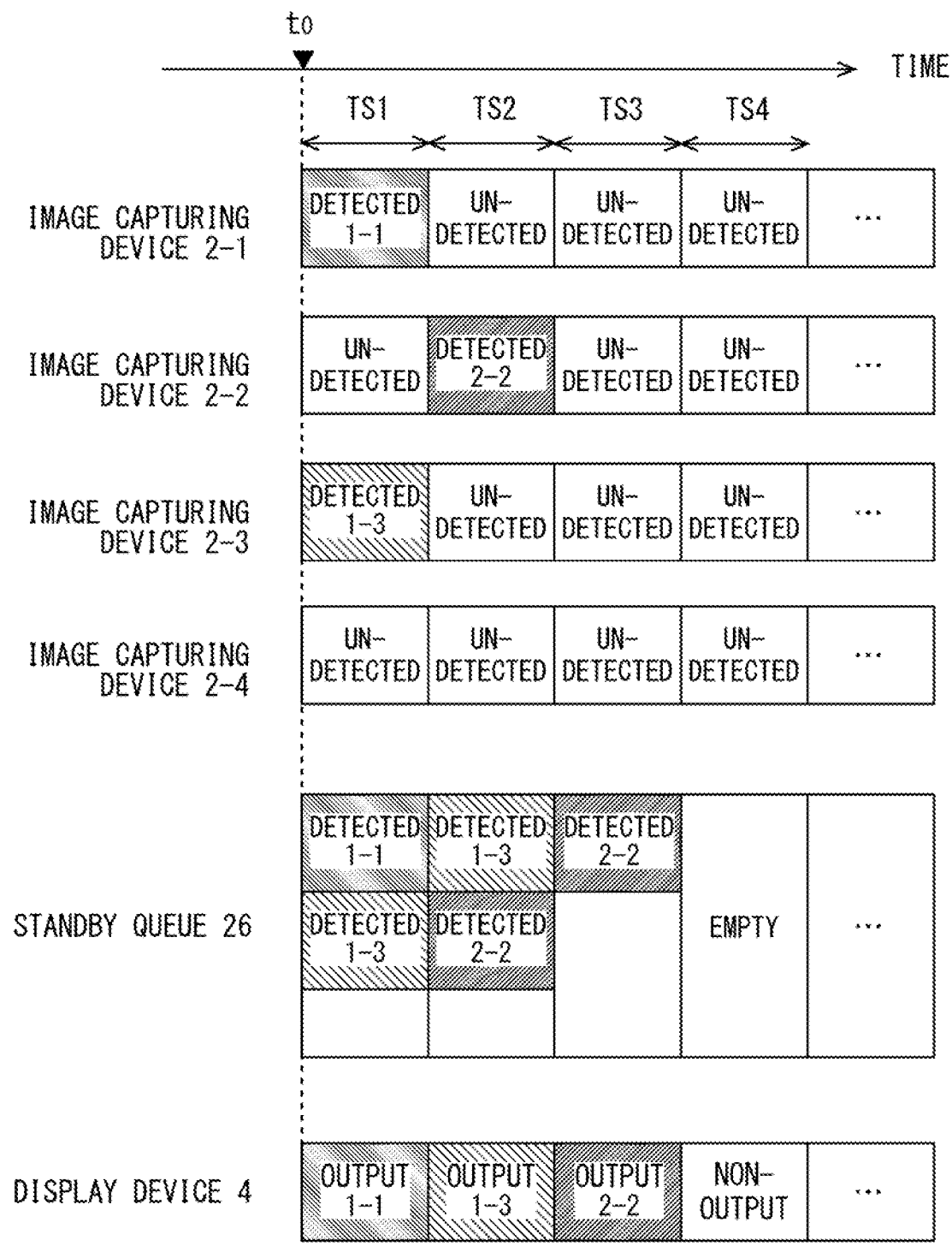
FIG. 8 is a diagram for explaining an example of processing of the display control device according to the second example embodiment.

Herein, a specific example of the processing illustrated in steps S20 to S29 in FIG. 5 will be described by using FIGS. 6 to 8. FIGS. 6 to 8 are diagrams for explaining an example of processing of the display control device 20 according to the second example embodiment. FIG. 6 illustrates a case where no target state is detected in each piece of video data in a time slot TS1 including the initialization time $t_0$. FIG. 7 illustrates a case where a target state is detected in video data of one image capturing device in the time slot TS1. FIG. 8 illustrates a case where a target state is detected in video data of two or more image capturing devices in the time slot TS1, and a target state is detected in video data of one image capturing device in a time slot TS2.

First, as illustrated in FIG. 6, the acquisition unit 21 of the display control device 20 acquires video data from each of the plurality of image capturing devices 2-1, 2-2, 2-3, and 2-4 in the time slot TS1 including the initial time to (TS1; step S20). However, in this example, the target state is not detected in any video data (No in step S21). Therefore, the display control device 20 does not store video data in the standby queue 26, and does not output any video data to the display device 4. Then, the display control device 20 returns the processing to step S20 in order to perform the processing in the next time slot TS2 (No in step S29).

As illustrated in FIG. 7, the acquisition unit 21 of the display control device 20 acquires a plurality of pieces of video data in the time slot TS1 including the initial time to (TS1; step S20). In this example, the target state is detected only in the video data of one image capturing device 2-3, and the detection unit 22 supplies target video data 1-3 related to the video data to the control unit 23 (Yes in step S21, No in step S23). In the example illustrated in FIG. 7, since there is no video data currently being supplied or scheduled to be supplied, the control unit 23 supplies the target video data 1-3 to the output unit 28 (No in step S24). The output unit 28 supplies the target video data 1-3 to the display device 4 (step S28). In order to perform the processing in the next time slot TS2 (No in step S29), the display control device 20 advances the processing to step S20 in the time slot TS2.

As illustrated in FIG. 8, the acquisition unit 21 of the display control device 20 acquires a plurality of pieces of video data in the time slot TS1 including the initial time to (TS1; step S20). In this example, a target state is detected in each piece of the video data of the two image capturing devices 2-1 and 2-3, and the detection unit 22 supplies these target video data 1-1 and 1-3 to the control unit 23 together with the photographing time (Yes in step S21, Yes in step S23). The allocation unit 24 allocates a time order in such a way that, for example, the target video data 1-1 of the image capturing device 2-1 having a smaller identification number are output in the first time slot and the target video data 1-3 of the image capturing device 2-3 are output in the second time slot (step S25). Herein, the standby unit 25 stores the target video data 1-1 in the storage place where the target video data 1-1 are first retrieved in the standby queue 26, and stores the target video data 1-3 in the storage place where the target video data 1-3 are second retrieved in the standby queue 26 (step S26). Then, the standby unit 25 extracts the target video data 1-1 allocated to the first time slot from the standby queue 26, and outputs the target video data 1-1 to the display device 4 via the output unit 28 (steps S27 to S28). At this time, the standby unit 25 causes the standby queue 26 to standby for the target video data 1-3 scheduled to be supplied until the output of the target video data 1-1 is completed (time-shift). When the output of the target video data 1-1 is completed, the standby unit 25 may move the target video data 1-3 up to the storage place where the target video data 1-3 are first retrieved in the standby queue 26.

Then, the display control device 20 acquires a plurality of pieces of video data in the next time slot TS2 (TS2; step S20). In the example illustrated in FIG. 8, the target state is detected only in the video data of one image capturing device 2-2, and the detection unit 22 supplies target video data 2-2 related to the video data to the control unit 23 (Yes in step S21, No in step S23). In this example, since the target video data 1-3 is being supplied or is scheduled to be supplied (Yes in step S24), the allocation unit 24 updates the allocation of the time order. More specifically, the allocation unit 24 allocates the time order of the target video data 2-2 after the target video data 1-3 having the earlier photographing time. Then, the standby unit 25 may store the target video data 2-2 in a storage place where the target video data 2-2 are retrieved second in the standby queue 26 (step S26). After retrieving and outputting the target video data 1-3 (steps S27 to S28), the display control device 20 advances the processing to step S20 in a time slot TS3.

In the second example embodiment, the detection unit 22 is included in the display control device 20. However, the detection unit 22 may be included in another device (not illustrated) communicably connected to the display control device 20. In this case, the acquisition unit 21 may receive the target video data as the detection result and the photographing time thereof from another device, and may supply the received information to the control unit 23.

In the second example embodiment, when there are only one target video data and there is no video data being supplied or scheduled to be supplied (No in step S23 and No in step S24), the control unit 23 supplies the target video data to the output unit 28. In this case, however, the control unit 23 may supply the target video data to the output unit 28 via the standby queue 26.

In the second example embodiment, for convenience of description, the time required for one cycle of processing is one time slot, but the present invention is not limited to this. In the second example embodiment, for convenience of description, the acquisition unit 21 acquires the video data of the next time slot after the target video data of one time slot is output to the display device 4, but the video data may be acquired without waiting for the output. For example, the output processing of the target video data illustrated in steps S27 and S28 may be performed independently of other processing including the acquisition processing illustrated in step S20.

As described above, according to the second example embodiment, the display control device 20 includes the standby unit 25 that temporarily stands by the target video data until the output timing. Therefore, the display control device 20 can time-shift the output of target video data other than the target video data being output even when there are a plurality of pieces of target video data in which the target state is detected at a time. As a result, the display control device 20 can sequentially output the target video data. Therefore, the display control device 20 can reduce the monitoring load of the monitoring person who monitors the monitored target, and prevent overlooking of the monitoring target.

Since the display control device 20 does not output video data which have not been detected, based on the detection of the target state, it is not necessary for the monitoring person to always watch the display device 4, and the monitoring load is reduced.

Third Example Embodiment

Next, a third example embodiment of the present disclosure will be described by using FIG. 9. The third example embodiment is characterized in that allocation of a time order is determined based on priority information in addition to a photographing time of target video data. A display control device 20 according to the third example embodiment has basically the same configuration and functions as the display control device 20 according to the second example embodiment.

However, the display control device 20 according to the third example embodiment is different from the display control device 20 according to the second example embodiment in that an allocation unit 24 of a control unit 23 allocates a time order, based on predetermined priority information in addition to the photographing time of the target video data.

The priority information is information indicating a priority of output between the video data relating to the plurality of image capturing devices 2. The priority information may be determined according to a type of a priority reason. For example, with respect to a priority reason such that a target state is detected in each piece of the video data of the image capturing device 2 installed at different places, the priority information may indicate a priority of an output determined in advance, based on the place where the image capturing device 2 is installed. As for a priority reason such as the detection of an operation of the monitoring target in the video data, the priority information may indicate the priority of the output determined according to the type of the detected operation of the monitoring target. When a plurality of priority reasons occur, priority information based on which priority reason is prioritized may be determined in advance in time order allocation.

When there are a plurality of pieces of target video data photographed in the same time slot TS, the allocation unit 24 determines these time orders, based on the priority information.

Figure 9:
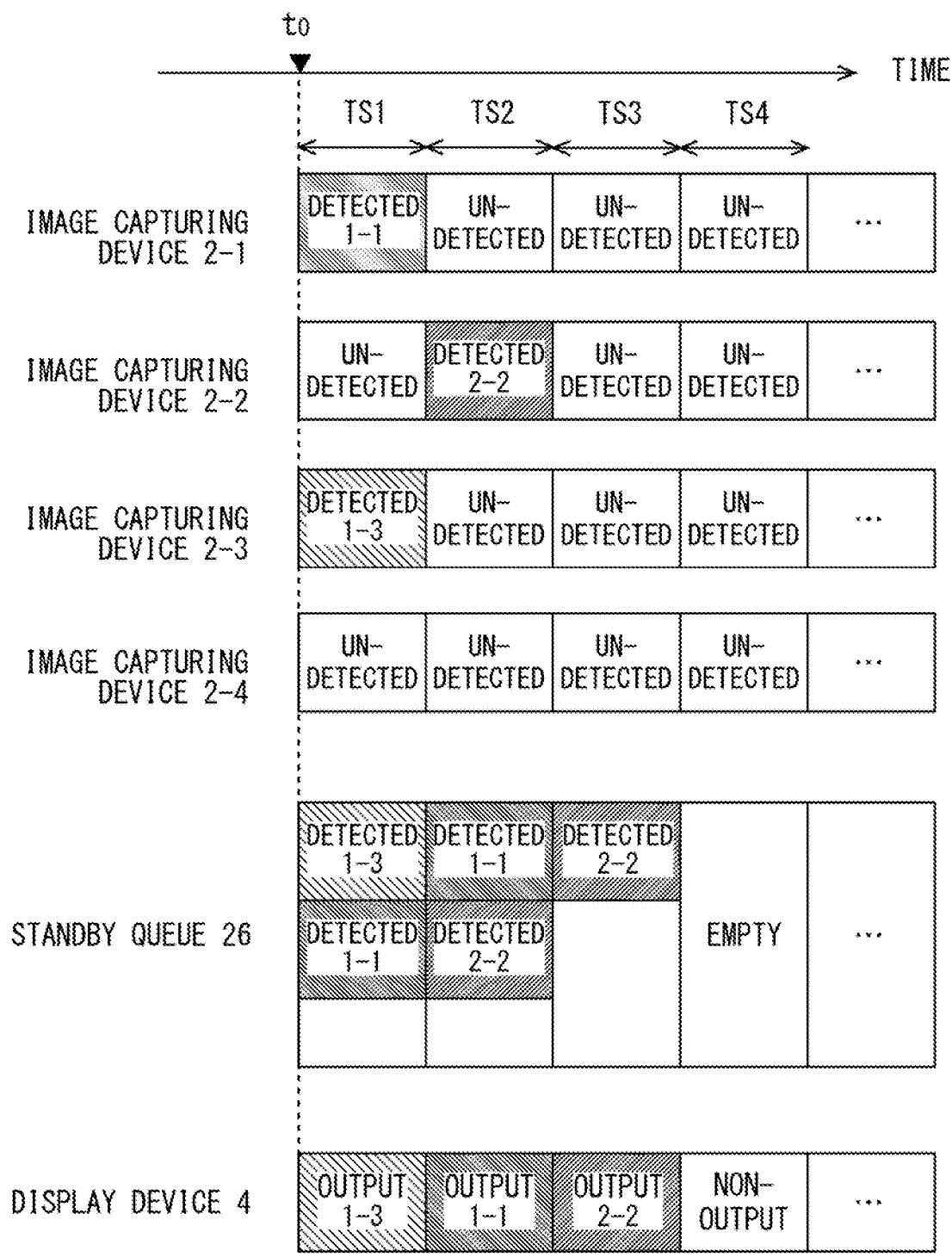
FIG. 9 is a diagram for explaining an example of processing of a display control device according to a third example embodiment.

FIG. 9 is a diagram for explaining an example of processing of the display control device 20 according to the third example embodiment. In the example illustrated in FIG. 9, similarly to the example illustrated in FIG. 8, in a time slot TS1 including the initialization time $t_0$, the target state is detected in each piece of video data of two image capturing devices 2-1 and 2-3. Herein, in this example, it is assumed that priority information for preferentially outputting the video data of the image capturing device 2-3 over the video data of the image capturing device 2-1 is determined in advance. In this case, in the time slot TS1, the allocation unit 24 allocates the time order, based on the priority information in such a way that target video data 1-3 of the image capturing device 2-3 are output in the first time slot and target video data 1-1 of the image capturing device 2-1 are output in the second time slot. Then, the target video data 1-3 are output in the time slot TS1, and the target video data 1-1 are output in a time slot TS2.

As described above, according to the third example embodiment, the display control device 20 determines the time order, based on the predetermined priority, and sequentially outputs the target video data, based on the time order. Therefore, the monitoring person can immediately confirm a situation of a place to be more focused on the monitoring, and can immediately take appropriate measures in accordance with the output video image.

Fourth Example Embodiment

Next, a fourth example embodiment of the present disclosure will be described by using FIGS. 10 to 12. The fourth example embodiment is characterized in that specific target video data having a high priority are interrupted and output during output of the target video data based on a time order.

Figure 10:
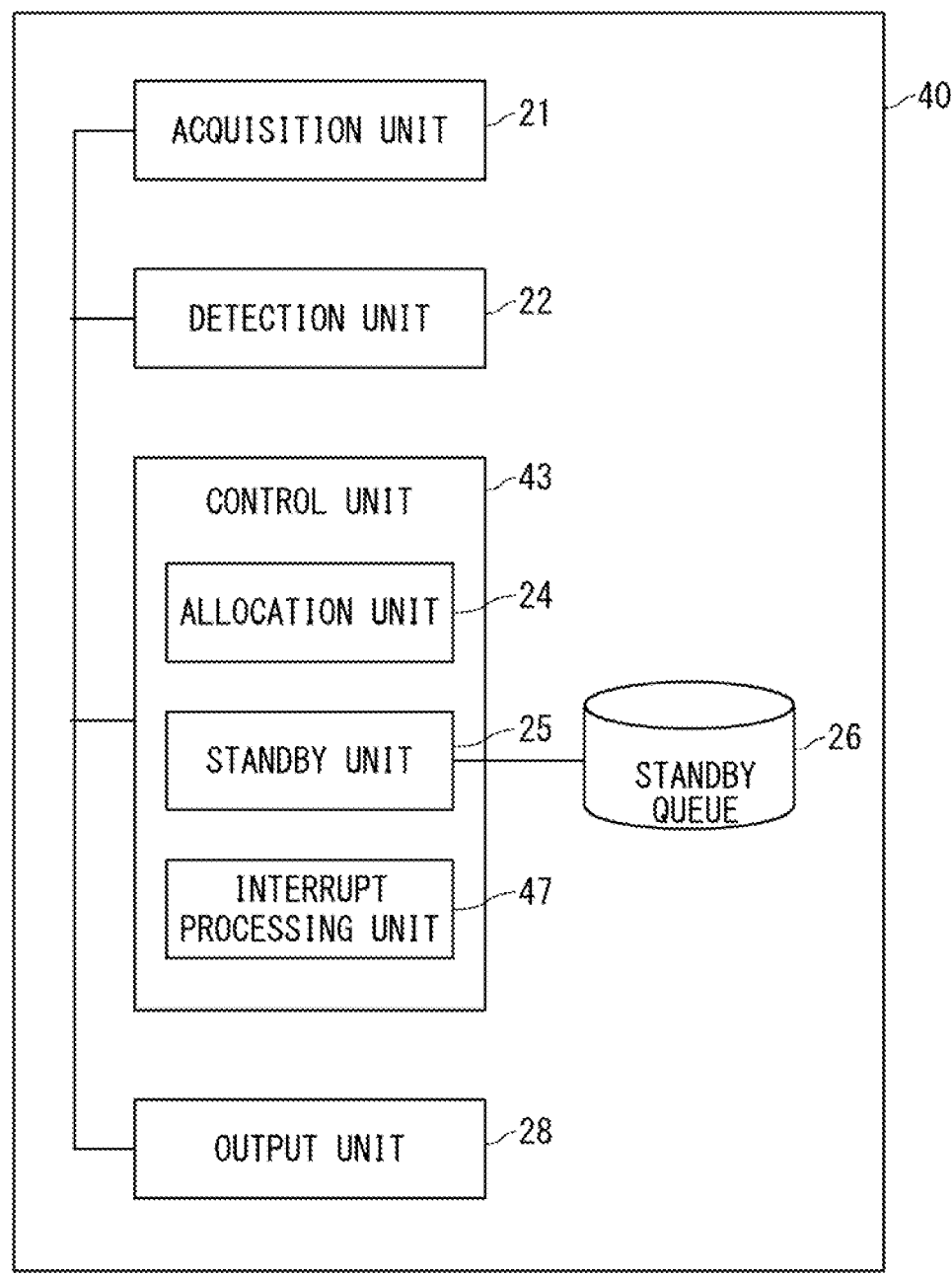
FIG. 10 is a block diagram illustrating an example of a configuration of a display control device according to a fourth example embodiment.

FIG. 10 is a block diagram illustrating an example of a configuration of a display control device 40 according to the fourth example embodiment. The display control device 40 according to the fourth example embodiment has basically the same configuration and functions as the display control device 20 according to the second to third example embodiments. However, the display control device 40 according to the fourth example embodiment differs in that a control unit 43 is provided instead of the control unit 23.

The control unit 43 includes an interrupt processing unit 47 in addition to the configuration and functions of the control unit 23.

The interrupt processing unit 47 is also called an interrupt processing means. In response to detection of a target state in video data of an image capturing device 2 having a high priority, the interrupt processing unit 47 causes a standby unit 25 to suspend supply of target video data currently supplied to an output unit 28. In other words, the interrupt processing unit 47 suspends the output of the target video data currently output to the display device 4. The priority is a priority to be determined based on an interrupt event. The interrupt event here may be the same as a priority reason, or may be a reason determined separately from the priority reason, which is more serious than the priority reason of the third example embodiment. Instead of suspending the currently supplied target video data, the interrupt processing unit 47 may postpone the supply of target video data scheduled to be supplied next. Then, the interrupt processing unit 47 causes the output unit 28 to supply the video data of the image capturing device 2 having a high priority. Namely, the interrupt processing unit 47 causes the display device 4 to output the target video data having a high priority.

Figure 11:
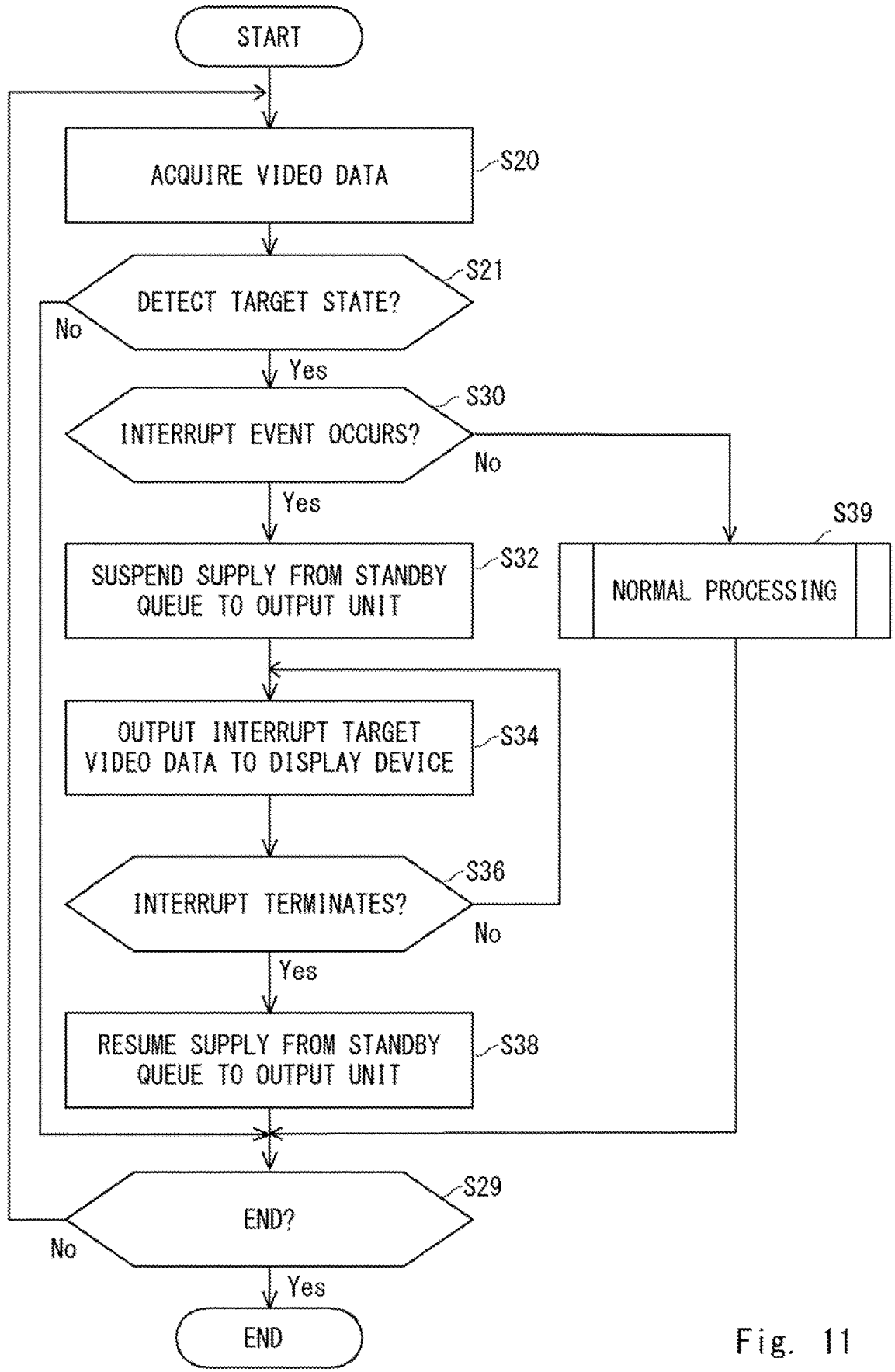
FIG. 11 is a flowchart illustrating an example of processing of the display control device according to the fourth example embodiment.
Figure 12:
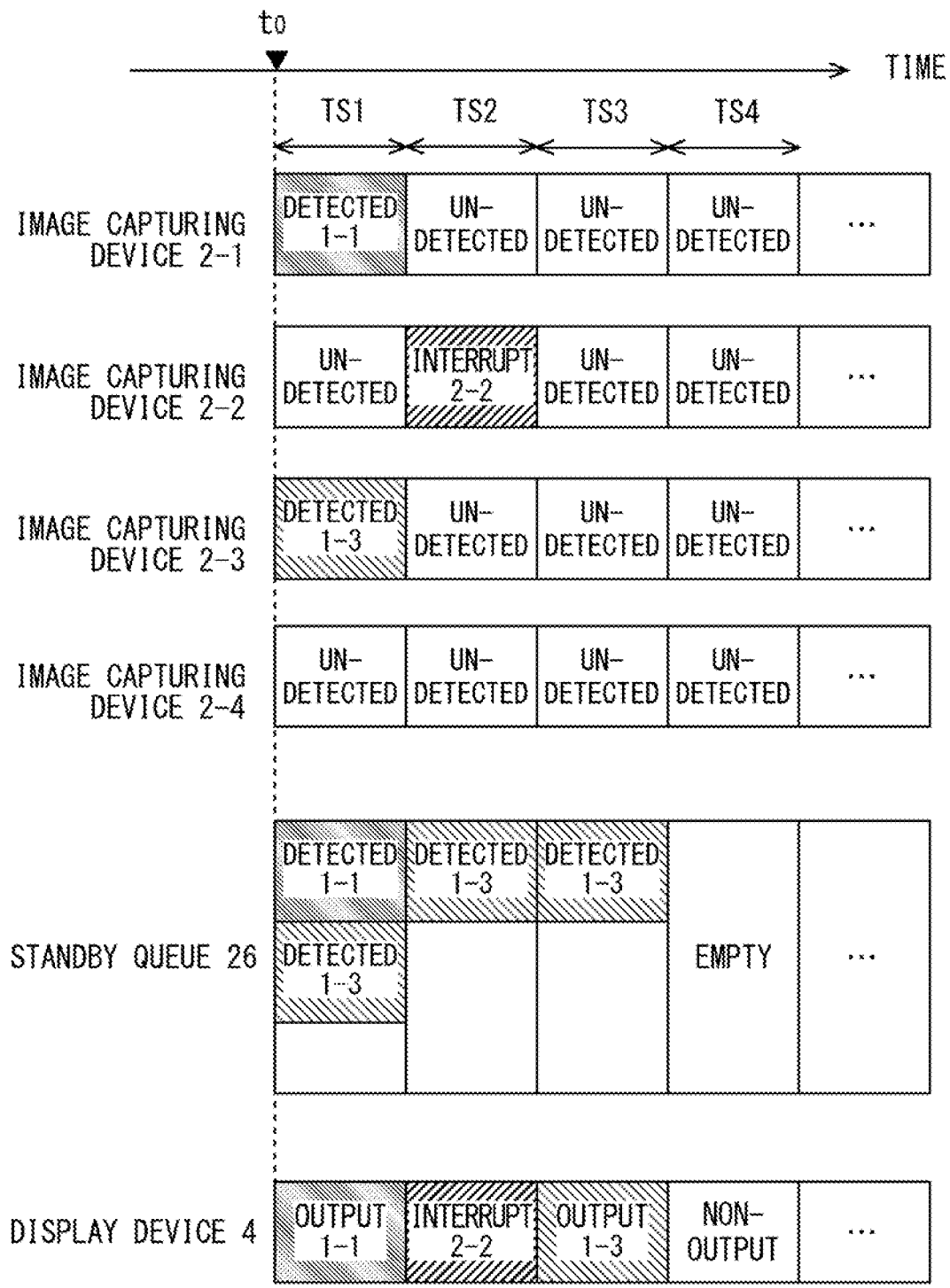
FIG. 12 is a diagram for explaining an example of processing of the display control device according to the fourth example embodiment.

FIG. 11 is a flowchart illustrating an example of processing of the display control device 40 according to the fourth example embodiment. Herein, the processing illustrated in FIG. 11 includes steps S30 to S39 instead of steps S23 to S28 illustrated in FIG. 5. The same processing as those in the steps illustrated in FIG. 5 are denoted by the same reference numerals, and description thereof is omitted.

In step S30, the interrupt processing unit 47 of the control unit 43 determines whether or not an interrupt event has occurred in response to the detection of the target state from the video data by the detection unit 22 in step S21. For example, the interrupt processing unit 47 may determine that an interrupt event has occurred in response to detection of target video data relating to a specific image capturing device 2 having a higher priority than the currently supplied target video data. The interrupt processing unit 47 may determine that an interrupt event has occurred in response to detection of a specific state associated to the interrupt event in the target video data. When the interrupt processing unit 47 determines that an interrupt event has occurred (Yes in step S30), the processing proceeds to step S32. On the other hand, when the interrupt processing unit 47 determines that an interrupt event has not occurred (No in step S30), the processing proceeds to step S39.

In step S32, the interrupt processing unit 47 causes the standby unit 25 to suspend or postpone the supply of the target video data currently being supplied or scheduled to be supplied next from the standby queue 26 to the output unit 28. Namely, the standby unit 25 suspends or postpones the output of the target video data currently being supplied or scheduled to be supplied next to the display device 4 via the output unit 28. When there is no target video data currently being supplied or scheduled to be supplied next, this step is omitted.

Next, in step S34, the interrupt processing unit 47 outputs the target video data relating to the interrupt to the display device 4 via the output unit 28.

Next, in step S36, the interrupt processing unit 47 determines whether or not to terminate interrupt processing. When the interrupt processing unit 47 determines to terminate the interrupt processing (Yes in step S36), the processing proceeds to step S38, and otherwise (No in step S36), the processing illustrated in step S34 is repeated.

In step S38, the interrupt processing unit 47 causes the standby unit 25 to resume supplying the target video data whose supply is suspended from the standby queue 26 to the output unit 28. Then, the output unit 28 outputs the target video data supplied from the standby unit 25 to the display device 4, and the processing proceeds to step S29. When step S32 is omitted, this step is also omitted.

When it is determined that an interrupt event has not occurred (No in step S30), the interrupt processing unit 47 may advance normal processing in step S39. Herein, the normal processing may be the processing illustrated in steps S23 to S28 of FIG. 5 as an example.

Herein, a specific example of the processing illustrated in FIG. 11 will be described by using FIG. 12. FIG. 12 is a diagram for explaining an example of processing of the display control device 40 according to the fourth example embodiment. FIG. 12 illustrates examples in which a target state is detected in each piece of the video data of two image capturing devices 2-1 and 2-3 in a time slot TS1 including an initial time $t_0$ in the same manner as FIG. 8. Therefore, in the time slot TS1, the display control device 40 performs the same processing as the processing described with reference to FIG. 8. However, the example illustrated in FIG. 12 differs from the example illustrated in FIG. 8 in that an interrupt event occurs in a time slot TS2.

In the time slot TS2, a plurality of pieces of video data are acquired (TS2; step S20). In this example, the target state is detected in video data of the image capturing device 2-2, and the detection unit 22 supplies target video data 2-2 related to the video data to the control unit 23 (Yes in step S21). At this time, the detection unit 22 may also supply the control unit 23 with information on the image capturing device 2-2 and detection result information on a detection result of the target video data 2-2. The interrupt processing unit 47 of the control unit 23 determines that an interrupt event has occurred, based on the information supplied from the detection unit 22 (Yes in step S30). The interrupt processing unit 47 causes the standby unit 25 to suspend the supply of target video data 1-3 currently being supplied to the output unit 28, and causes the standby queue 26 to standby for non-supplied target video data 1-3 (step S32). Namely, the interrupt processing unit 47 switches the target video data which have been being output to the display device 4 to time-shift output. The interrupt processing unit 47 causes the display device 4 to output the target video data 2-2 related to the interrupt via the output unit 28 (step S34). Then, in response to the completion of the output of the target video data 2-2 (Yes in step S36), the interrupt processing unit 47 causes the standby unit 25 to resume the supply of the target video data 1-3 during suspending the supply (step S38).

Note that even when an interrupt event is detected later in the same slot, the interrupt processing unit 47 may suspend the supply of the target video data currently being supplied or scheduled to be supplied, and may perform the interrupt processing illustrated in steps S32 to S38.

As described above, according to the fourth example embodiment, when an interrupt event occurs, the display control device 40 executes the interrupt processing as exception processing. Therefore, even when there are the target video data currently being supplied or scheduled to be supplied, the display control device 40 can preferentially display the specific target video data in a case where the specific target video data having a high priority are acquired later. As a result, a monitoring person can more immediately confirm a situation of a place to be monitored in an emergency, and can more immediately take appropriate measures in accordance with the output video image.

For example, in the case of use in a hospital, when a nurse who has noticed a change in a monitored video image determines that information displayed in the monitored video image is information related to the patient, another nurse can urgently go to the patient in order to take appropriate measures.

The nurse may immediately notify a security guard when the information displayed in the monitored video image is information related to intrusion of a suspicious individual. The nurse may take appropriate emergency measures when the information on the monitored video image is information on other emergency situations.

Other Example Embodiments

The surveillance support system including the display control device according to the first to fourth example embodiments can be used, in particular, for monitoring a school, a commercial facility at night, or the like, or for monitoring by a maintenance base of a security company.

(School)

For example, when monitoring is implemented by surveillance support system of the present disclosure in a school in a time period when there are few entrance and exit of persons, such as class hours, a staff can confirm persons entering and exiting the premise and a school building without missing. As an installation example, cameras are installed at a school gate and an entrance of each school building, and a monitor is installed in a staff room. Since prevention of illegal intruders is the primary purpose here, a priority of output is set in advance at high priority for the camera installed at a school gate, and the priority of output is set in advance at low priority for the camera installed at the entrance of each school building. For example, when the entrance of a person is detected at the school gate while movement of a student at the entrance of the school building is being displayed on the monitor, video images of the school gate may be displayed by being interrupted. A staff who has checked the video images of the school gate can promptly take actions such as going to a school gate with a plurality of people or calling the police, thereby enabling to prevent illegal intrusions or accidents from occurring. Since video images of the student is time-shifted and displayed on the monitor, video images of the entrance of the school building during a period when the video of the school gate is interrupted can be prevented from being overlooked. In addition, a student who has been displayed at the entrance of the school building during class can be provided with appropriate guidance by dispatching another staff member or holding interviews at a later date. In addition, the display control device may register in advance photographs of staff, students, and contractors, and when it is detected that these persons have entered and exited at the school gate, the display control device may not output the video images to the monitor, or the like.

(Commercial Facilities at Night)

By introducing the surveillance support system of the present disclosure in a commercial facility in which a large number of monitoring cameras are installed, a load on monitoring can be reduced. Herein, a priority of output is set in advance at a high priority in such a way as to preferentially output monitoring camera video images such as an employee entrance or exit by interruption even when other monitored video images are output to the monitor. This makes it possible to efficiently monitor an intrusion of suspicious persons. At this time, since video images of another monitoring camera is displayed on the monitor by time-shift output, it is possible to prevent a monitoring person from overlooking the video images. Note that the surveillance support system of the present disclosure can also be introduced to monitor a residential building or a warehouse at night and the same effect can be acquired.

(Maintenance Base of Security Company)

By applying the surveillance support system of the present disclosure in accordance with the number of maintenance bases of a security company and efficiently consolidating places where the surveillance support system is managed, shortening of a dispatch time to a site in the event of an emergency response can be expected. A monitoring load is distributed in this manner, thereby leading to cost reduction of daily monitoring at a monitoring target place where the present system is introduced.

In the first to fourth example embodiments described above, the computer is configured by a computer system including a personal computer, a word processor, and the like. However, the present invention is not limited to this, and the computer may be configured by a server of a local area network (LAN), a host of computer (personal computer) communication, a computer system connected on the Internet, or the like. It is also possible to distribute the functions among devices on the network and configure the computer with the entire network.

Although this disclosure has been described as a hardware configuration in the first to fourth example embodiments described above, this disclosure is not limited to this. This disclosure can also be realized by causing a processor 1010 to execute a computer program, which will be described later, to perform the above-described display control processing.

Figure 13:
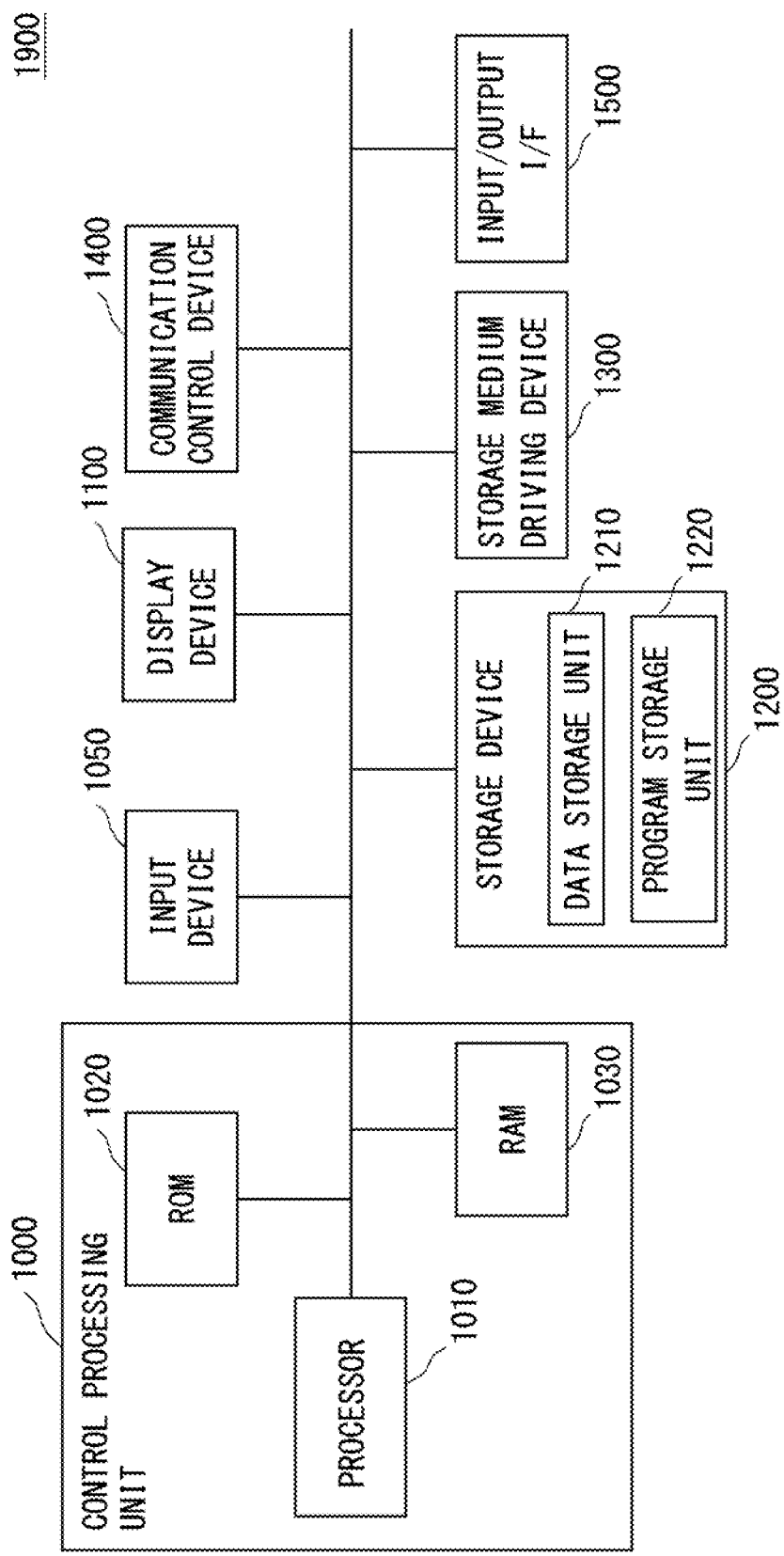
FIG. 13 is a schematic configuration diagram of a computer according to the first to fourth example embodiments.

FIG. 13 is an example of a configuration diagram of a computer 1900 according to the first to fourth example embodiments. As illustrated in FIG. 13, the computer 1900 includes a control processing unit 1000 for controlling the entire system. An input device 1050, a storage device 1200, a storage medium driving device 1300, a communication control device 1400, and an input/output I/F 1500 are connected to the control processing unit 1000 via a bus line such as a data bus.

The control processing unit 1000 includes a processor 1010, a ROM 1020, and a RAM 1030.

The processor 1010 performs various types of information processing and control in accordance with programs stored in various storage units such as the ROM 1020 and the storage unit 1200.

The ROM 1020 is a read-only memory in which various programs and data for the processor 1010 to perform various controls and calculations are stored in advance.

The RAM 1030 is a random access memory used as a working memory for the processor 1010. Various areas for performing various processing according to the first to fourth example embodiments can be secured in the RAM 1030.

The input device 1050 is an input device that receives input from a user such as a keyboard, a mouse, and a touch panel. For example, the keyboard is provided with a ten-key pad, function keys for executing various functions, and various keys such as cursor keys. The mouse is a pointing device, and is an input device that specifies an associated function by clicking a key, an icon, or the like displayed on the display device 1100. The touch panel is an input device disposed on a surface of the display device 1100, which specifies a touch position of a user that is associated to various operation keys displayed on the screen of the display device 1100, and accepts an input of an operation key displayed in association with the touch position.

As the display device 1100, for example, a CRT, a liquid crystal display, or the like is used. On the display device, input results by a keyboard or a mouse are displayed, and finally retrieved image information is displayed. The display device 1100 displays an image of operation keys for performing various necessary operations from the touch panel in accordance with various functions of the computer 1900. Note that the display device 1100 is associated to the display device 4 of the first to fourth example embodiments.

The storage device 1200 includes a readable/writable storage medium and a driving device for reading/writing various information such as a program and data from/to the storage medium.

Although a hard disk or the like is mainly used as a storage medium used in the storage device 1200, a non-transitory computer-readable medium used in a storage medium driving device 1300 to be described later may be used.

The storage device 1200 includes a data storage unit 1210, a program storage unit 1220, and other storage units, which are not illustrated, (for example, a storage unit for backing up a program, data, or the like stored in the storage device 1200). The program storage unit 1220 stores a program for realizing various processing in the first to fourth example embodiments. The data storage unit 1210 stores various pieces of data of various databases according to the first to fourth example embodiments.

The storage medium driving device 1300 is a driving device for the processor 1010 to read a computer program, data including a document, and the like from an external storage medium.

Herein, the external storage medium refers to a non-transitory computer-readable medium in which a computer program, data, and the like are stored. Non-transitory computer-readable media include various types of tangible storage media. Examples of non-transitory computer-readable media include magnetic recording media (e.g., flexible disk, magnetic tape, hard disk drive), magneto-optical recording media (e.g., magneto-optical disk), CD-Read Only Memory (ROM), CD-R, CD-R/W, semiconductor memory (e.g., Mask ROM, Programmable ROM (PROM), Erasable PROM (EPROM), Flash ROM, Random Access Memory (RAM)). The various programs may also be supplied to the computer by various types of transitory computer-readable media. Examples of transitory computer-readable media include electrical signals, optical signals, and electromagnetic waves. The transitory computer-readable medium can supply various programs to the computer via a wired communication path such as an electric wire and an optical fiber, or a wireless communication path and the storage medium driving device 1300.

Namely, in the computer 1900, the processor 1010 of the control processing unit 1000 reads various programs from an external storage medium set in the storage medium driving device 1300, and stores them in each unit of the storage device 1200.

When the computer 1900 executes various processing, the computer 1900 reads a relevant program from the storage device 1200 into the RAM 1030 and executes the program. However, the computer 1900 can also directly read and execute a program from an external storage medium to the RAM 1030 by the storage medium driving device 1300 instead of from the storage device 1200. Depending on the computer, various programs and the like may be stored in the ROM 1020 in advance and executed by the processor 1010. Further, the computer 1900 may download and execute various programs and data from another storage medium via the communication control device 1400.

The communication control device 1400 is a control device for network connection between the computer 1900 and various external electronic devices such as another personal computer and a word processor. The communication control device 1400 makes it possible to access the computer 1900 from these various external electronic devices.

The input/output I/F 1500 is an interface for connecting various input/output devices via a parallel port, a serial port, a keyboard port, a mouse port, and the like.

As the processor 1010, a central processing unit (CPU), graphics processing unit (GPU), field-programmable gate array (FPGA), digital signal processor (DSP), application specific integrated circuit (ASIC), or the like may be used. In addition, a plurality of these may be used in parallel.

An order of execution of each processing in the systems and methods described in the claims, specification, and drawings is not expressly specified as [before], [prior to], etc., and may be implemented in any order unless an output of the preceding processing is used in a subsequent processing. For the sake of convenience, the description using [first], [next], and the like with respect to an operation flow in the claims, the description, and the drawings does not imply that it is indispensable to carry out the operations in this order.

Although the present disclosure has been described above with reference to the example embodiments, the present disclosure is not limited to the above. The configuration and details of the present disclosure can be appropriately changed within a range not departing from the spirit.

This application claims priority to Japanese Patent Application No. 2020-073276, filed on Apr. 16, 2020, the entire disclosure of which is incorporated herein by reference.

INDUSTRIAL APPLICABILITY

The display control device according to the present disclosure can be used for monitoring a person or an object.

REFERENCE SIGNS LIST

1 SURVEILLANCE SUPPORT SYSTEM
2 IMAGE CAPTURING DEVICE
4 DISPLAY DEVICE
8 NETWORK
10, 20, 40 DISPLAY CONTROL DEVICE
11,21 ACQUISITION UNIT
13,23,43 CONTROL UNIT
18,28 OUTPUT UNIT
22 DETECTION UNIT
24 ALLOCATION UNIT
25 STANDBY UNIT
26 STANDBY QUEUE
47 INTERRUPT PROCESSING UNIT
1000 CONTROL PROCESSING UNIT
1010 PROCESSOR
1020 ROM
1030 RAM
1050 INPUT DEVICE
1100 DISPLAY DEVICE
1200 STORAGE DEVICE
1210 DATA STORAGE UNIT
1220 PROGRAM STORAGE UNIT
1300 STORAGE MEDIUM DRIVING DEVICE
1400 COMMUNICATION CONTROL DEVICE
1500 INPUT/OUTPUT I/F
1900 COMPUTER

What is claimed is:

1. A display control device comprising:
at least one memory storing instructions; and
at least one processor configured to execute the instructions to:
acquire video data captured by each of a plurality of image capturing devices from each of the plurality of image capturing devices;
allocate a time order of output to a display device to each piece of target video data being the video data in which a target state of a monitoring target is detected, in response to detection of the target state from each of two or more pieces of the video data among a plurality of pieces of the video data, based on predetermined priority information indicating a priority of output between pieces of video data relating to the plurality of image capturing devices;
rearrange the target video data based on the allocated time order, and store the rearranged target video data in a standby queue;
sequentially output the target video data from the standby queue to the display device, based on the allocated time order; and
suspend the output of the target video data being currently output to the display device, in response to acquisition of target video data having a high priority of output, and cause the display device to output the target video data having the high priority of output.

2. The display control device according to claim 1, wherein the at least one processor is further configured to execute the instructions to allocate the time order, based on a photographing time of the target video data.

3. The display control device according to claim 1, wherein the at least one processor is further configured to execute the instructions not to output, to the display device, video data in which the target state has not been detected among the video data relating to the plurality of image capturing devices.

4. The display control device according to claim 1, wherein the priority information indicates a priority of the output determined in advance, based on a place where the plurality of image capturing devices are installed.

5. A surveillance support system comprising:
a plurality of image capturing devices configured to capture an image of a monitoring target and generate video data;
a display device configured to display target video data; and
a display control device comprising:
at least one memory storing instructions, instructions; and
at least one processor configured to execute the instructions to:
acquire video data captured by each of the plurality of image capturing devices from each of the plurality of image capturing devices;
allocate a time order of output to the display device to each piece of target video data being the video data in which a target state of the monitoring target is detected, in response to detection of the target state from each of two or more pieces of the video data among a plurality of pieces of the video data, based on predetermined priority information indicating a priority of output between pieces of video data relating to the plurality of image capturing devices;
rearrange the target video data based on the allocated time order, and store the rearranged target video data in a standby queue;
sequentially output the target video data from the standby queue to the display device, based on the allocated time order; and
suspend the output of the target video data being currently output to the display device, in response to acquisition of target video data having a high priority of output, and cause the display device to output the target video data having the high priority of output.

6. The surveillance support system according to claim 5, wherein the priority information indicates a priority of the output determined in advance, based on a place where the plurality of image capturing devices are installed.

7. A display control method comprising:
  acquiring video data captured by each of a plurality of image capturing devices from each of the plurality of image capturing devices;
  allocating a time order of output to a display device to each piece of target video data being the video data in which a target state of a monitoring target is detected, in response to detection of the target state from each of two or more pieces of the video data among a plurality of pieces of the video data, based on predetermined priority information indicating a priority of output between pieces of video data relating to the plurality of image capturing devices; and
  rearranging the target video data based on the allocated time order, and storing the rearranged target video data in a standby queue;
  sequentially outputting the target video data from the standby queue to the display device, based on the allocated time order; and
  suspending the outputting of the target video data being currently output to the display device, in response to acquisition of target video data having a high priority of output, and causing the display device to output the target video data having the high priority of output.

8. The display control method according to claim 7, wherein the priority information indicates a priority of the output determined in advance, based on a place where the plurality of image capturing devices are installed.

* * * * *